M. JEWELL.
MOWING MACHINE.
APPLICATION FILED NOV. 5, 1908.

942,075.

Patented Dec. 7, 1909.
8 SHEETS—SHEET 1.

Fig. 1.

Witnesses:
Axel Bertram
Howard Hanscom

Inventor:
Martin Jewell,
by Walter E. Lombard,
Atty.

M. JEWELL.
MOWING MACHINE.
APPLICATION FILED NOV. 5, 1908.

942,075.

Patented Dec. 7, 1909.
8 SHEETS—SHEET 4.

Witnesses:
Nathan C. Lombard
Axel Bertram

Inventor:
Martin Jewell,
by Walter E. Lombard,
Atty.

M. JEWELL.
MOWING MACHINE.
APPLICATION FILED NOV. 5, 1908.

942,075.

Patented Dec. 7, 1909.
8 SHEETS—SHEET 5.

Witnesses:
Nathan C. Lombard
Axel Bertram

Inventor:
Martin Jewell,
by Walter E. Lombard,
Atty.

UNITED STATES PATENT OFFICE.

MARTIN JEWELL, OF CLINTON, MAINE.

MOWING-MACHINE.

942,075.  Specification of Letters Patent.  Patented Dec. 7, 1909.

Application filed November 5, 1908. Serial No. 461,241.

*To all whom it may concern:*

Be it known that I, MARTIN JEWELL, a citizen of the United States of America, and a resident of Clinton, in the county of Kennebec and State of Maine, have invented certain new and useful Improvements in Mowing-Machines, of which the following is a specification.

This invention relates to mowing machines and has for its object the production of a machine in which the operating parts are reduced to a minimum and located adjacent to the finger bar supporting mechanism, thus leaving that portion of the machine at the left of the pole free from moving devices.

The invention consists in certain novel features of construction and arrangement of parts which will be readily understood by reference to the description of the drawings and to the claims hereinafter given.

Of the drawings.

Similar characters designate like parts throughout the several figures of the drawings.

In the drawings, 10 represents the main axle or shaft of a mowing machine, the ends of said shaft having mounted on each end thereof a supporting or driving wheel 11 freely revoluble thereon. Keyed to the shaft 10 inside of the wheels 11 are the sleeves 12 each provided with a ratchet wheel 13 which are adapted to be engaged by the pawls 14 pivoted at 15 to the wheels 11. A curved spring 16 secured to each of the pawls 14 is adapted to hold the pawl in engagement with the ratchet wheel 13 when the machine is in operation and to hold the pawl out of engagement with the ratchet wheel when it is desired that the cutting apparatus should not operate. The axle 10 has a bearing in a long cylindrical member 17 interposed between the two members 12.

A divided block 18 and 19 is clamped to the member 17 by means of the staple 20 and the nuts 21 thereon, the parallel ends 22 of said staple extending through the pole 23 of the machine. This pole is prevented from lateral movement by means of the ribs 24 formed upon the part 19 of the divided block. The part 19 of the divided block is provided with a forwardly extending projection 25 which is secured to the pole 23 by means of the bolt 26 and nut 27 threaded thereto. The bolt 26 and the parallel ends 22 of the staple 20 all extend through the spring arm 28, the outer end of which carries the usual seat 29 for the operator. The member 17 at one end is provided with a forwardly extending arm 30 formed integral therewith and terminating in a vertical plate 31, this plate 31 having secured thereto at 32 the brace rod 33, the opposite end of which extends through a lug 34 formed upon the member 17 near its opposite end. This end of the brace rod 33 is threaded and has mounted thereon on either side of said lug 34 the nuts 35 by which the position of the plate 31 may be slightly adjusted to take care of any undue strain brought to bear thereon. The brace rod 33 near its connection with the plate 31 is provided with two shouldered flanges 36 between which is interposed a split sleeve 37 having forwardly projecting ears to which is pivotally secured a draw rod 38 provided at its forward end with a hook 39 to which the usual whiffletrees 40 are secured. A link 41 supported by an eye 42 mounted in the pole 23 retains the free end of said draw rod 38 in elevated position when the whiffletrees 40 are not in use. On the pole 23 is secured the usual tool box 43 and oil can holder 44 both of which may be of any well-known construction. The plate 31 is provided with a circular slot 45 through which extends a bolt 46 secured to a second plate 47. The plate 31 is also provided with a bolt 48 extending through a slot 49 in the second plate 47, the two plates being held in contact with one another by means of suitable nuts 50 threaded to the outer ends of said bolts 46 and 48. The plate 31 is also provided with an outwardly extending circular flange 51 to which the inner edge of the plate 47 fits, this circular flange and the slots 45 and 49 all being concentric so that the plate 47 may be freely movable on said plate 31 in a circular path about a common center 60. This movement of the plate 47 on the plate 31 is accomplished by means of a link 52 secured to the lug 53 formed upon said plate 47, the opposite end of said link 52 being pivoted at 54 to a suitable hand lever 55 which in turn is pivoted at 56 to an upwardly extending arm 57 formed integral with the member 17. This lever 55 is provided with the usual hand-controlling locking device 58 coöperating with a fixed notched sector 59 to retain the plate 47 in any position to which it may be adjusted about the center 60 by means of said lever 55. The plate 47 is provided with laterally extending bifurcated ears 61 adapted to receive the ears 62 of the finger bar supporting shoe 63, the ears 62 of the shoe 63 being pivotally connected to the ears 61 by means of the pins 64. The shoe 63 has secured thereto the usual finger bar 65 having mounted thereon the usual fingers or guards 66. Superimposed upon the finger bar 65 is a plate 66* having at either end upwardly extending ears 67 and 68, each of which has secured thereto in alinement with one another spring buffers 69, each of said buffers 69 inclosing a rubber block 70.

The ear 67 is provided with an extension 71 which normally engages the under side of a perforated lug 72 formed upon a plate 73 slidably mounted upon the outer face of the plate 47 in such a manner that it may be readily moved vertically thereon between suitable guide plates 74. The upper end of the plate 73 is provided with ears 75 in which is pivotally mounted a lever 76, to one end of which is pivoted a rod 77 having a cylindrical end 78 extending through an opening in the lug 72 and normally resting upon the end of the projection 71 from the ear 67.

The lever 76 is connected by a chain 79 to a rocker member 80 mounted upon a stud 81 formed upon the oil can holder 44. To a toe 83 of said rocker member 80 is secured a spring 84, the opposite end of which is adjustably connected at 85 to the pole 23. Extending laterally from the rocker member 80 is a lug 86 adapted to be engaged by the pivoted lever 87 to move said rocker lever 80 about its pivot 81 to lift the free end of the lever 76 and force the cylindrical end 78 through the opening in the lug 72 against the face of the projection 71 to cause the finger bar to be moved about the pivot pins 64, thus lifting the finger bar to avoid obstructions in the path thereof.

The lever 87 is provided with the usual hand-operated locking device 88 coöperating with the fixed notched segment 89 to retain the rocker member 80 in adjusted position. Connected at 90 to the rocker member 80 is a link 91 pivoted to the rocker lever 92 pivoted at 93 to a bracket 94 superimposed upon the arm 28, said lever 92 being provided with a foot pad 95 by which said rocker member 80 may be moved about its pivot 81 to effect a lifting of the finger bar in the manner just described.

The slide 73 is provided with a lug 96 with which the end of the pivoted lever 97 coöperates to retain said sliding member 73 in its normal position or any other position to which it may be desirable to adjust it. The opposite end of the pivoted lever 97 is connected by a link 98 to a rocker lever 99 pivoted at 100 to a lug formed upon the bearing member 17, the free end of said rocker lever 99 being provided with a foot pad 101 by which the operator may effect a movement of the slide 73 when it is desired to do so.

The lever 99 is provided with a tooth 102 engaging with one of a plurality of detents in a fixed segment 103 secured to the bearing member 17, a spring 104 serving to keep said tooth 102 in engagement until the operator by pressure upon the foot pad 101 forces the lever 99 laterally against the tension of the spring 104 so as to disengage said tooth from the detents in the segment 103, thus permitting the finger bar to assume an inclined position with its outer end lower than its inner end. This is found desirable when the wheels of the mowing machine are traveling practically on level ground and the finger bar is traveling over ground which slightly falls away, thus permitting an even cut of grass on such sloping ground.

When the ground slopes upwardly and it is desired that the outer end of the finger bar should be higher than the inner end, said finger bar may be raised into such position either by means of an operation of the lever 92 or the hand lever 87 to give the requisite amount of lift to the outer end of said finger bar. When traveling to the field which it is desired to mow the finger bar is lifted into substantially a vertical position and is secured in this position by means of the ordinary hook 105 engaging with an eye 106 projecting from the finger bar 65. It is obvious, therefore, that through the various mechanisms just described the finger bar may be tilted in either direction about a center 60 by a movement of the plate 47 upon the fixed plate 31 or it may be brought into an inclined position with its outer end lower than its inner end or its outer end higher than its inner end as may be required. It is believed that the advantages of this combination of movement of the finger bar will be sufficiently evident from the foregoing without further description.

Mounted upon the finger bar 65 and traveling through the finger guards 66 is a reciprocating knife bar 107 provided with a plurality of cutting blades 108. To the inner end of the bar 107 is secured a member 109 provided with vertical guides 110, the inner opposed faces of which are made concentric and in these guides is mounted so as to be moved vertically therein a divided block 111, the opposite walls of which are made cylindrical and fit the concaved guides 110 so that said block 111 may be moved slightly in one direction or the other about its vertical axis. The block 111 has mounted between the two parts thereof so as to be movable therein in any direction a ball member 112 provided with a cylindrical opening extending diametrically therethrough adapted to receive a cylindrical stud 113 formed upon the end of a pivoted lever 114. A collar 113* is secured to the outer end of the stud 113 to prevent the accidental displacement of the block 111 when the machine is dismembered.

The vertical movement of the block 111 in the guides 110 is limited by means of a rod 110* interposed between the outer ends of said guides 110. The opposite end of the lever 114 is adapted to receive the outer end of a lateral projection or pivot such as the rocker shaft 115 to which it is secured by means of a pivot pin 116. The rocker shaft 115 is provided with a bearing in the cylindrical end 117 of the arm 57 formed upon the bearing member 17. The opposite end of the rocker shaft 115 is reduced in diameter, as at 118, and has mounted thereon so as to be freely movable about the axis thereof a sleeve 119 provided with a handle 120, said sleeve being held in position upon the rocker shaft 115 by means of the collar 121 pinned thereto.

Figure 12:
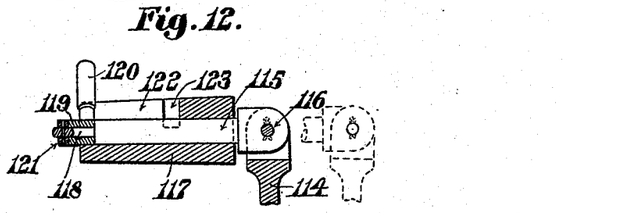
Fig. 12 represents a vertical section of the same, the cutting plane being on line 12—12 on Fig. 10.
Figure 13:
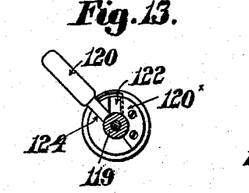
Fig. 13 represents a transverse section, the cutting plane being on line 13—13 on Fig. 10.
Figure 14:
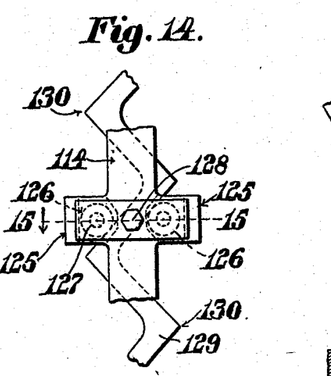
Fig. 14 represents an elevation of a portion of the revoluble zigzag wheel and a portion of the swinging knife bar operating arm coöperating therewith.
Figure 15:
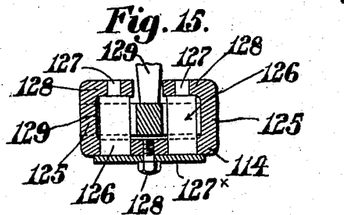
Fig. 15 represents a section on line 15—15 on Fig. 14.
Figures 16, 19:
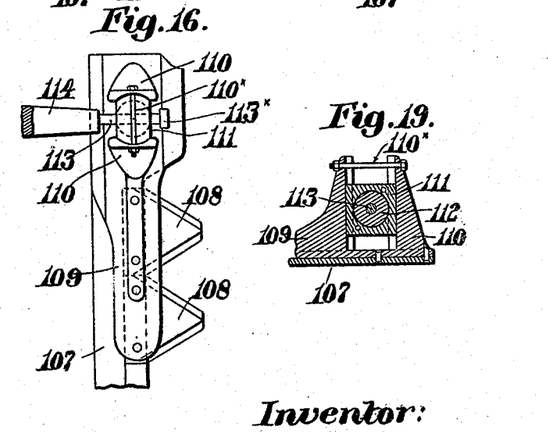
Fig. 16 represents a plan of the knife bar and the universal connection secured thereto and coöperating with the free end of the swinging knife bar operating arm.
Fig. 19 represents a vertical section of the same, the cutting plane being on line 19—19 on Fig. 17.
Figures 17, 18:
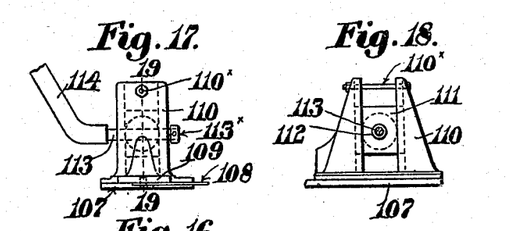
Fig. 17 represents an elevation of the same.
Fig. 18 represents a side elevation of the universal connection.

The cylindrical member 117 has formed therein a bayonet slot 122 provided at one end with the notch 123 and at the other with the shouldered recess 124. The handle 120 is adapted to be moved about the axis of the rocker shaft 115 and moved longitudinally of the slot 122 and into the notch 123 or the shouldered recess 124 to lock the rocker shaft 115 either in the position shown in Fig. 12 in full lines, or in the position shown in said figure in dotted lines. The handle 120 is retained in the notch 123 or in the recess 124 by the spring 120*.

Figure 1:
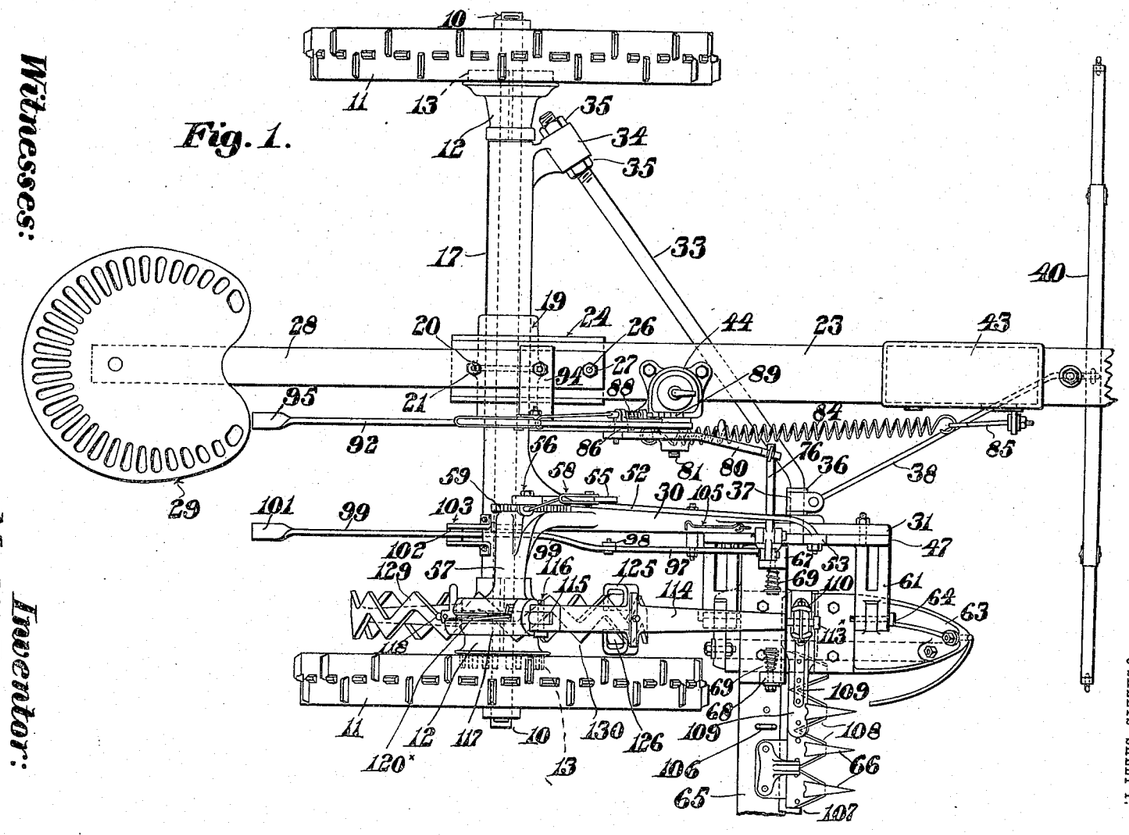
Figure 1 represents a plan of a mowing machine embodying the features of this invention, a portion of the finger bar and knife bar being broken away.
Figure 2:
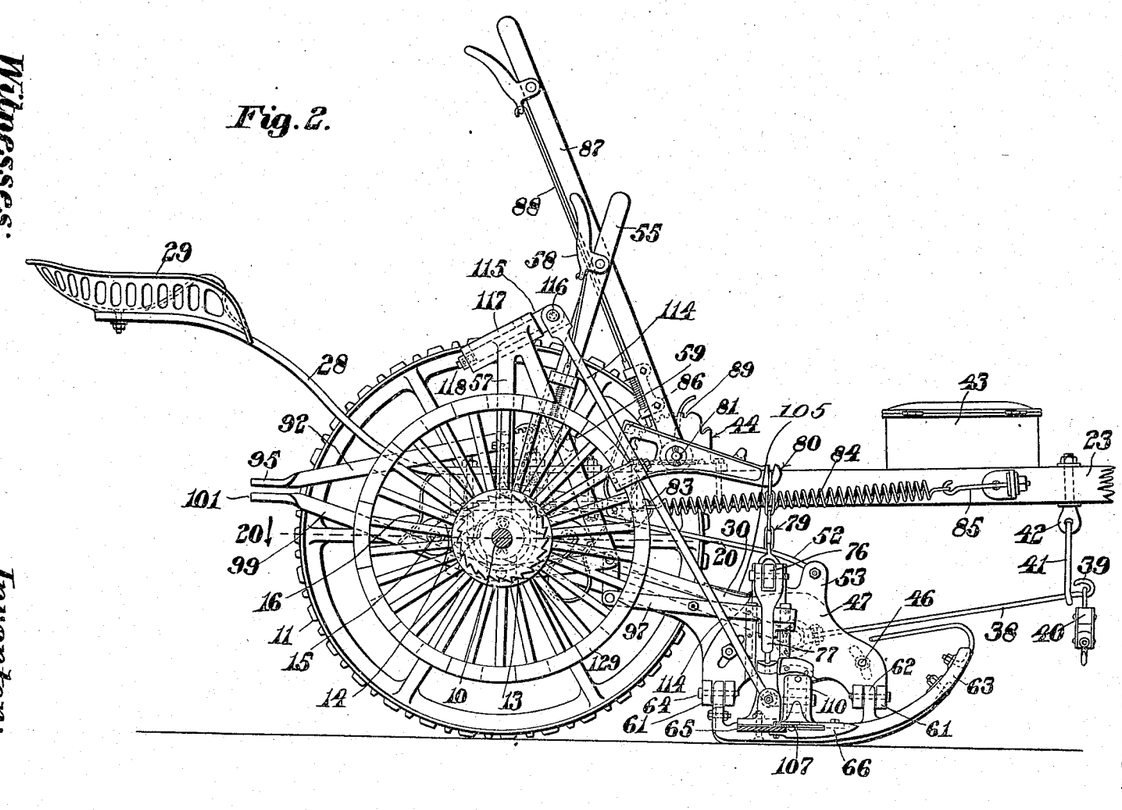
Fig. 2 represents an elevation of the same with the nearest driving wheel cut away and the finger bar and knife bar cut in section.
Figure 3:
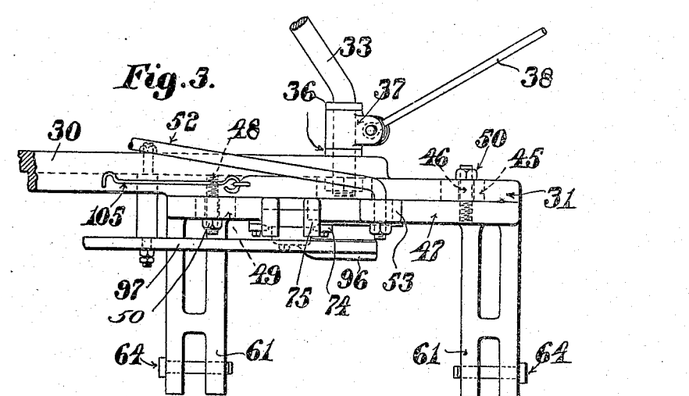
Fig. 3 represents a plan of the finger bar supporting plate and the fixed plate on which it is movably mounted.
Figure 4:
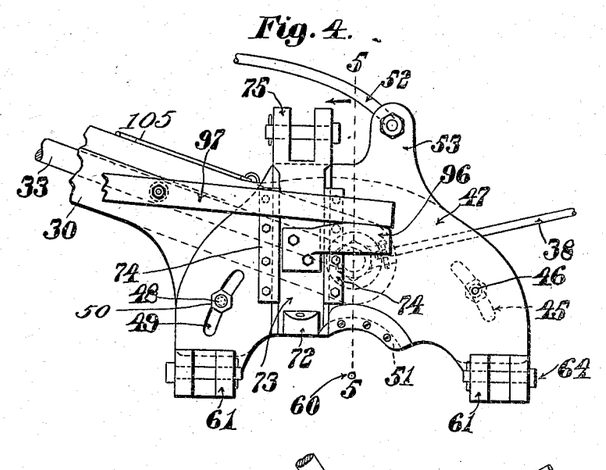
Fig. 4 represents an elevation of the same.
Figure 5:
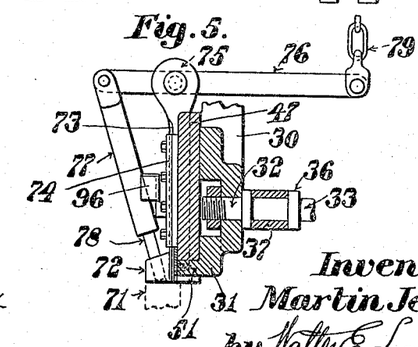
Fig. 5 represents a vertical section of the same, the cutting plane being on line 5—5 on Fig. 4.
Figure 6:
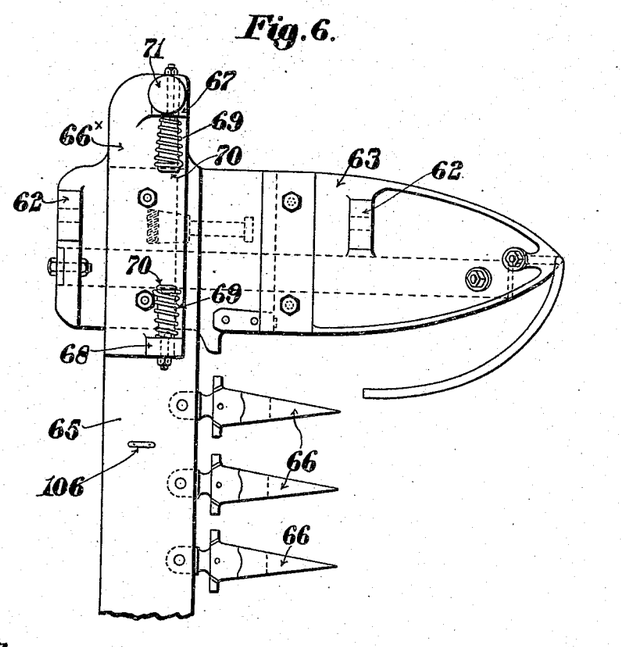
Fig. 6 represents a plan of a portion of the finger bar and its supporting shoe.
Figure 7:
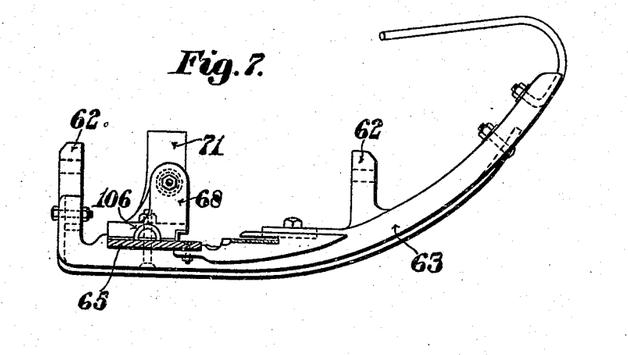
Fig. 7 represents an elevation of the same.
Figure 8:
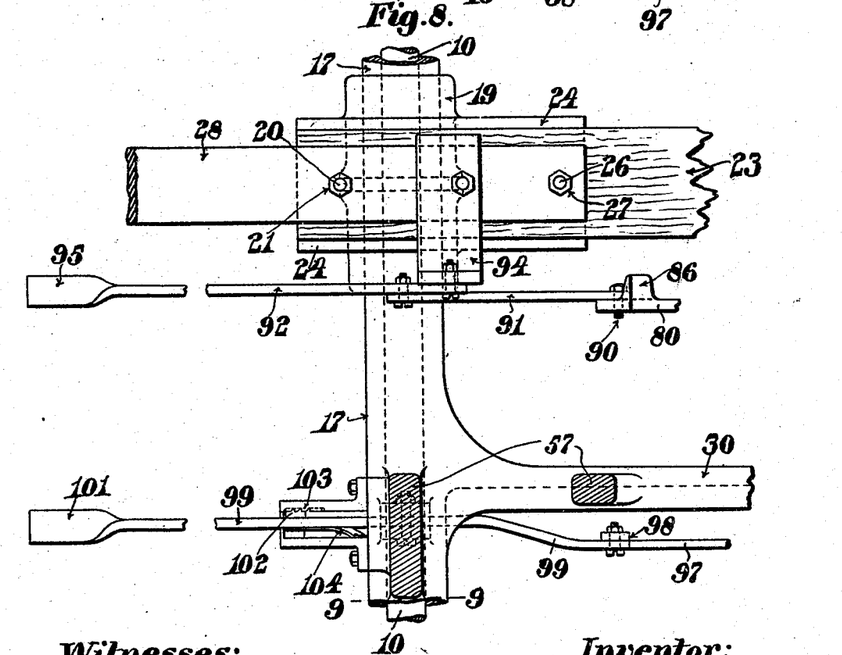
Fig. 8 represents a plan of a portion of the axle bearing and the various levers mounted thereon for tilting and lifting the finger bar.
Figure 9:
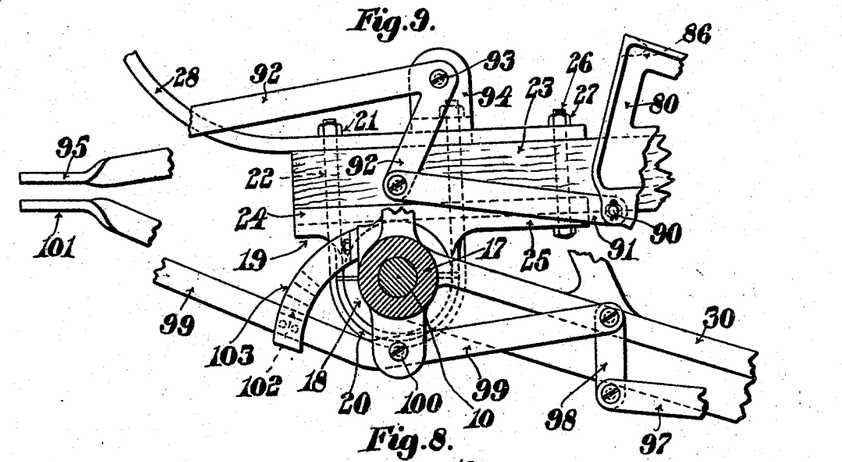
Fig. 9 represents a vertical section of the same, the cutting plane being on line 9—9 on Fig. 8.
Figures 10, 11:
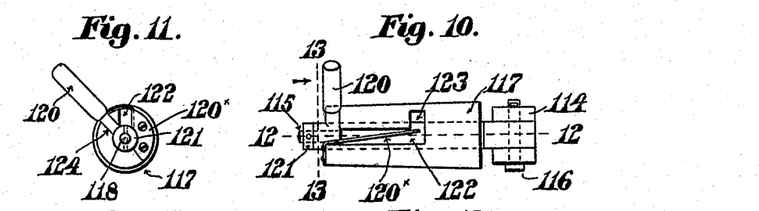
Fig. 10 represents a plan of the pivotal connection of the knife-operating arm and the locking device therefor.
Fig. 11 represents an end elevation of the same.
Figures 20, 21:
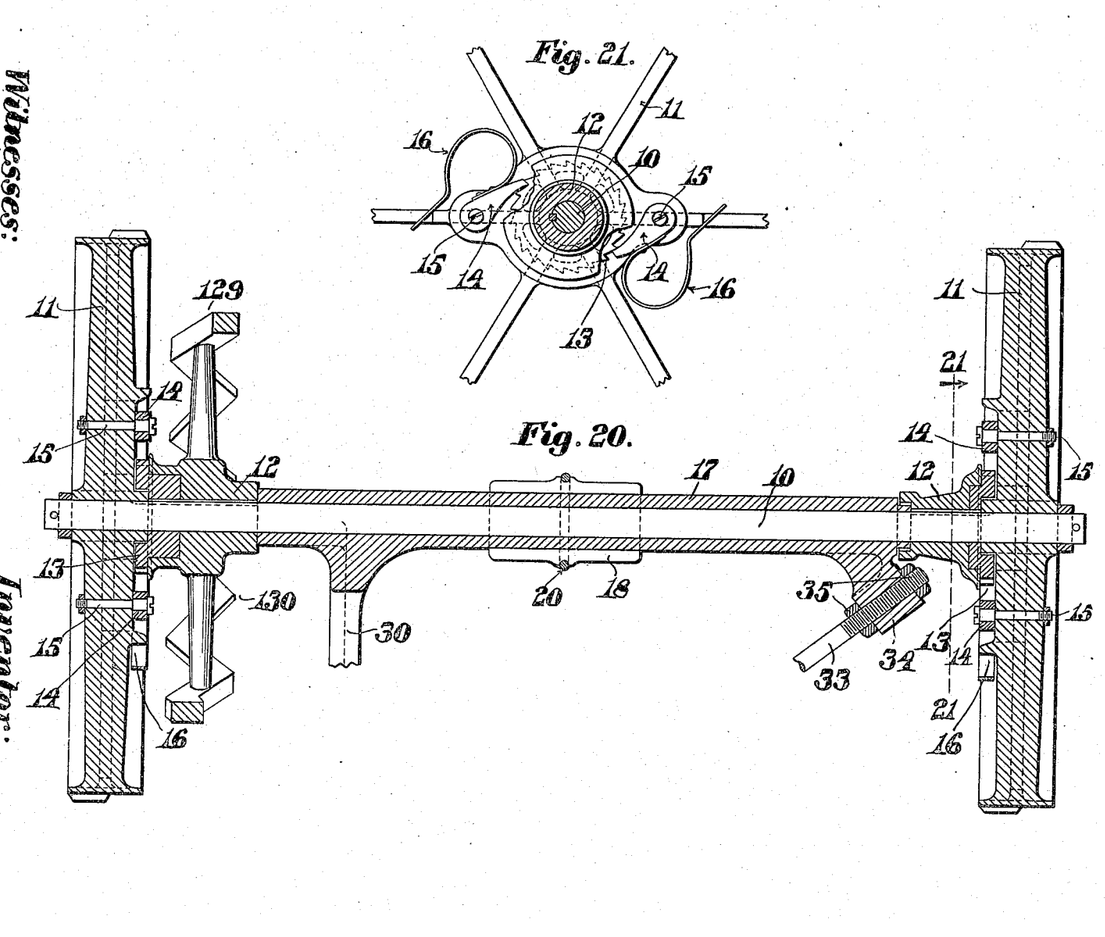
Fig. 20 represents a horizontal section of the axle bearing, the driving wheel, the revoluble zigzag wheel and the ratchets for driving said zigzag wheel.
Fig. 21 represents a section on line 21—21 on Fig. 20, showing a portion of one of the driving wheels.
Figure 22:
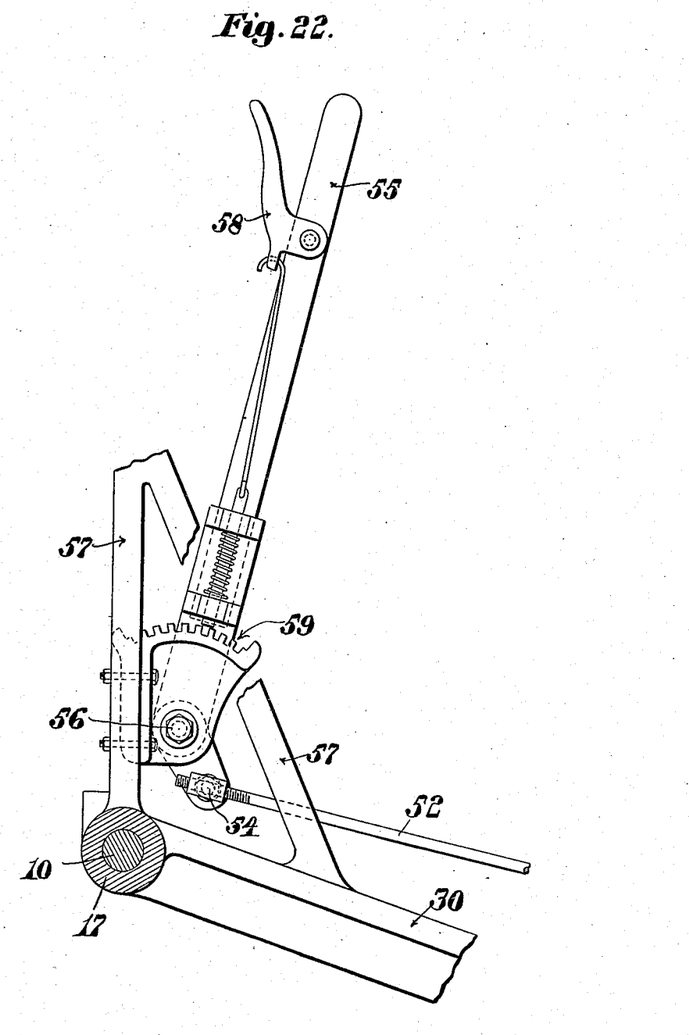
Fig. 22 represents an elevation of the devices for controlling the tilting of the finger bar.

Intermediate its two ends the pivoted lever 114 is provided with two rearwardly projecting members 125 in which are mounted the roller members 126 having reduced ends 127 in ears 128 of said rearwardly extending projections 125 while the other ends of the rollers 126 extend through openings in the pivoted lever 114 and are held in position by means of the plate 127* secured to the pivoted lever 114 by the bolt 128. These rollers engage with the substantially parallel radiating zigzag walls of a revoluble wheel 129 formed upon or secured to one of the members 12 and fastened by keys or otherwise to the axle 10. When the pawls 14 are thrown into the position shown in Figs. 2 and 21 in engagement with the ratchet wheels 13 and held in such position by means of the springs 16, it is obvious that when any forward movement of the machine occurs that the rotation of the driving or supporting wheels 11 will cause the ratchet wheels 13 to rotate the axle 10 and cause the zigzag wheel 129 to rotate with the supporting wheels 11. This rotation of the zigzag wheel 129 will cause the radiating walls of said zigzag wheel to act upon the rollers 126 mounted in the projections on the pivoted lever 114 to cause the lever 114 to be swung about its pivot 115, said pivot oscillating in its bearing 117 during such swinging movement.

When either roller 126 passes over one of the points 130 of the zigzag wheel the free end of the pivoted lever 114 will come into contact with one of the spring buffers 69—70 and will be given a sudden return impulse which will carry it over the point 130 so that a continuous swinging movement is imparted to the pivoted lever 114. This swinging movement of the lever 114 through its universal connection with the knife bar causes the necessary reciprocation of the knife bar through the finger guards to effect the cutting of the grass in the usual manner.

It is obvious that the universal connection shown between the pivoted lever 114 and the knife bar is such as to provide for the various inclinations of the knife bar in either direction and the various angles which the pivoted lever 114 assumes in effecting a reciprocation of said knife bar. Even when the wheel 129 is revolving the reciprocation of the knife bar 107 may be stopped by moving the handle 120 about the axis of the rocker shaft 115 and moving it along the bayonet slot 122 and engaging it in the notch 123, this operation causing the rollers 126 to be moved out of the path of the parallel walls of the zigzag revoluble wheel 129, thus preventing the further swinging of the pivoted lever 114 and stopping further reciprocation of the cutting members.

This makes a very effective mowing machine, simplifying the construction by reducing the number of parts and making it more effective in operation by concentrating all the operating mechanisms at the right-hand side of the pole so that they can be conveniently manipulated by the operator either by hand or foot, leaving the left hand side of the machine entirely free of operating mechanisms so as to provide easy access to the seat. By locating the zigzag wheel adjacent to the right hand driving wheel a direct universal connection may be made between the pivoted lever operated thereby and the knife bar which performs the operation of cutting.

By making the brace rod 33 adjustable any undue strain brought to bear upon the finger bar during the operation of cutting may be compensated for by a suitable adjustment of this rod. The provision of means whereby the finger bar may be readily tilted in either direction and its outer end lowered or raised as desired is a great advantage in a machine of this class.

Another great advantage of this machine is the facility with which the knife bar may be drawn in and out of action during the revolution of the revoluble wheel 129, by the simple movement of the handle 120 along the bayonet slot in the bearing 117.

It is believed that from the foregoing the operation and many advantages of a machine of this construction will be fully apparent without further description.

Having thus described my invention, I claim:

1. In a mowing machine, the combination of a revoluble wheel provided with substantially parallel radiating zigzag walls; a pivoted lever in front of said wheel; a projection thereon; means for retaining said projection in contact with one of said walls; a knife bar; a universal joint upon said knife with which said pivoted lever is directly connected; and means for moving said lever about said joint to remove said projection from the path of said walls.

2. In a mowing machine, the combination of a revoluble wheel provided with substantially parallel radiating zigzag walls; a pivoted lever in front of said wheel; a projection thereon; means for retaining said projection in contact with one of said walls; a knife bar; a universal joint upon said knife bar with which said pivoted lever is directly connected; and means for moving said lever about said joint to remove said projection from the path of said walls and locking it in such disengaged position.

3. In a mowing machine, the combination of a revoluble wheel provided with substantially parallel radiating zigzag walls; a pivoted lever in front of said wheel provided with members for engaging said walls; a knife bar; a universal joint upon said bar with which said lever is directly connected; and means for moving said lever outwardly from the axis of said wheel about said joint to disengage said members from said walls.

4. In a mowing machine, the combination of a revoluble wheel provided with a radiating zigzag wall; a pivoted lever in front of said wheel provided with a member normally engaging said wall; a knife bar; a universal joint upon said bar with which said lever is directly connected; and means for moving said lever outwardly from the axis of said wheel about said joint to disengage said member from said wall.

5. In a mowing machine, the combination of a revoluble wheel provided with a radiating zigzag wall; an upright lever in front of said wheel having a member normally engaging said wall and provided at its upper end with a lateral projection; a fixed bearing for said projection in which it is adapted to oscillate; a knife bar; a universal joint upon said bar with which the other end of said lever is directly connected; and means for moving said projection outwardly in its bearing to disengage said wall-engaging member from said wall.

6. In a mowing machine, the combination of a revoluble wheel provided with a radiating zigzag wall; an upright lever in front of said wheel having a member normally engaging said wall and provided at its upper end with a lateral projection; a fixed bearing for said projection in which it is adapted to oscillate; a knife bar; a universal joint upon said bar with which the other end of said lever engages; and means for moving said projection outwardly in its bearing to disengage said wall-engaging member from said wall and lock it in disengaged position.

7. In a mowing machine, the combination of a revoluble wheel provided with a radiating zigzag wall; an upright lever in front of said wheel having a member normally engaging said wall and provided at its upper end with a lateral projection; a fixed bearing for said projection in which it is adapted to oscillate; a radiating member on said projection; a bayonet slot in said bearing with which said radiating member engages; a knife bar; and a universal connection between said knife bar and the other end of said lever.

8. In a mowing machine, the combination of a revoluble wheel provided with a radiating zigzag wall; an upright lever in front of said wheel having a member normally engaging said wall and provided at its upper end with a lateral projection; a fixed bearing for said projection in which it is adapted to oscillate; a radiating member loosely mounted on said projection; a bayonet slot in said bearing with which said radiating member engages; a knife bar; and a universal connection between said knife bar and the other end of said lever.

9. In a mowing machine, the combination of a revoluble wheel provided with a radiating zigzag wall; an upright lever in front of said wheel having a member normally engaging said wall and provided at its upper end with a lateral projection; a fixed bearing for said projection in which it is adapted to oscillate; a radiating member loosely mounted on said projection; a bayonet slot in said bearing with which said radiating member engages; a spring coacting with said radiating member; a knife bar; and a universal connection between said knife bar and the other end of said lever.

10. In a mowing machine, the combination of a revoluble wheel provided with a radiating zigzag wall; an upright lever in front of said wheel having a member normally engaging said wall and provided at its upper end with a lateral projection; a fixed bearing for said projection in which it is adapted to oscillate; a radiating member loosely mounted on said projection; a bayonet slot in said bearing with which said radiating member engages; a spring coacting with said radiating member; a knife bar; and a universal connection between said bar and the other end of said lever.

11. In a mowing machine, the combination of a revoluble wheel provided with substantially parallel radiating zigzag walls; a knife bar; a lever in front of said wheel pivoted at one end and universally connected at the other end to said knife bar and provided with projecting members intermediate its ends normally engaging said walls; and means for moving said lever about said universal connection to disengage said projecting members from said walls.

12. In a mowing machine, the combination of a revoluble wheel provided with substantially parallel radiating zigzag walls; a knife bar; a lever in front of said wheel pivoted at one end and universally connected at the other end to said knife bar and provided with projecting members intermediate its ends normally engaging said walls; means for moving said lever about said universal connection to disengage said projecting members from said walls; and a device for locking said lever with its projecting members engaged with or disengaged from said walls.

Signed by me at Clinton Maine this 20th day of October 1908.

MARTIN JEWELL.

Witnesses:
ALICE O. DODGE,
CORA A. DODGE.